No. 746,046. PATENTED DEC. 8, 1903.
P. C. DOCKSTADER.
TRANSPORTATION TICKET SYSTEM.
APPLICATION FILED JAN. 5, 1903.
NO MODEL. 2 SHEETS—SHEET 2.
WITNESSES:
INVENTOR.
Preston C. Dockstader No. 746,046.	Patented December 8, 1903.

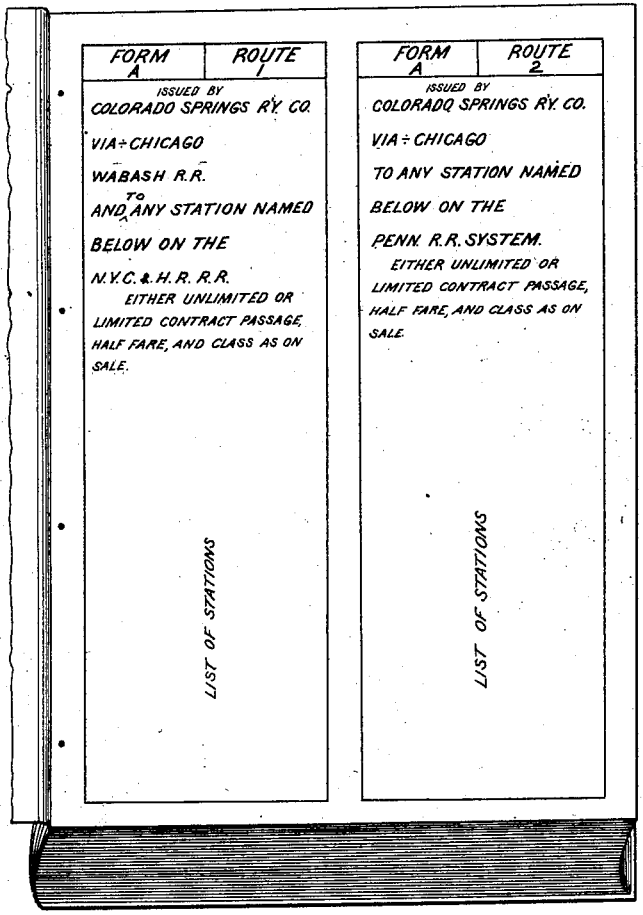

UNITED STATES PATENT OFFICE.

PRESTON C. DOCKSTADER, OF COLORADO SPRINGS, COLORADO.

TRANSPORTATION-TICKET SYSTEM.

SPECIFICATION forming part of Letters Patent No. 746,046, dated December 8, 1903.

Application filed January 5, 1903. Serial No. 137,810. (No model.)

*To all whom it may concern:*

Be it known that I, PRESTON C. DOCKSTADER, a citizen of the United States, residing at Colorado Springs, in the county of El Paso and State of Colorado, have invented certain new and useful Improvements in a System of Tickets Adapted for Railroad or Steamboat Use and the Like, of which the following specification is a full and clear description, with reference to the accompanying drawings, forming part of this specification.

My invention has for its objects to simplify the kind of through ticket and local ticket now in use, to condense the detail now printed on tickets, to reduce the number and kinds of tickets, to devise a single ticket for use over various transportation-lines, to devise a ticket that is hard to counterfeit or change in any of its parts. I attain these objects by a system having a descriptive ticket-book and a condensed ticket devised to apply to all kinds of ticket-transportation illustrated in the descriptive ticket-book, in which—

Figure 1 is a perspective view of a descriptive ticket-book, illustrating a page of said book on which is printed two tickets, each representing different routes, giving the form and route-number at the top followed by the junction-point and railroads over which same can be applied and the different stations on the terminal line to which tickets may be sold. Fig. 2 illustrates a condensed ticket adapted for use in connection with descriptive ticket-book. Fig. 3 illustrates a perspective view of a record-book of through tickets for conductors' or agents' use. Fig. 4 illustrates a view of a part of the back of the ticket on which is printed a consideration clause as part purchase price for the ticket for purchaser's signature. Figs. 5, 6 illustrate a condensed round-trip ticket adapted for use in connection with descriptive ticket-book. Fig. 7 illustrates the lower part of the tickets shown by Figs. 2 and 5, 6 left blank where the junction-points and railroads are printed, the junction-points and railroads to be stamped or written in the ticket. Fig. 8 illustrates a rubber stamp having the name of a railroad and that railroad's junction-point on its face.

Similar letters indicate corresponding parts in the different illustrations.

The descriptive ticket-book, Fig. 1, is made either in solid book form or as an adjustable loose-leaf book, the loose-leaf book being preferable to enable a general passenger agent to call in any leaf covering a ticket canceled and when desired issuing another in its place. This descriptive ticket-book illustrates every kind of ticket on sale by the railroad company shown in the coupon-ticket cases used by the various railroads, the tickets being arranged alphabetically as to railroads to enable the agent to easily and quickly locate the terminal railroad over which purchaser of ticket wishes to travel, this terminal railroad having all its various tickets illustrating the different routes in connection with the terminal line arranged alphabetically, these tickets in the descriptive ticket-book to have all the description necessary for information of the agent selling ticket, and to designate the ticket there will be a form and route. For illustration, in the accompanying drawings, Fig. 1, two tickets are illustrated as issued by the Colorado Springs Railway Company. Form A represents all tickets routed via Chicago, the route being indicated by a figure—*i. e.*, route 1—via the Wabash Railroad to any point on the New York Central and Hudson River Railroad, that line being the terminal railroad. Route 2 is over the Pennsylvania system to any point on that line, as the Pennsylvania is the terminal railroad, different route-numbers for each ticket to be used until every route out of Chicago is completed, a round-trip ticket to be designated by "Form A 1," another kind of ticket "Form A 2," each kind of ticket a railroad wishes to issue taking a different form, each junction-point being designated by the letters of the alphabet—for illustration, Chicago, "A;" Atchison, "B;" Kansas City, "C;" St. Joseph, "D," &c., this descriptive ticket-book to be indexed alphabetically similar to a dictionary. In compiling the descriptive ticket-book the tickets may be arranged alphabetically as to junction-points or as to gateways (a term applied to large routing-points like Chicago) instead of railroads; but it will not assist in locating route passenger desires as readily as indexing alphabetically by railroads.

A descriptive ticket-book of all kinds of local tickets may be made from the local tickets on sale by a railroad and a condensed ticket designed on a similar plan to the through-ticket system, this ticket system being for both local and through business and applicable to all kinds of ticket-transportation.

The ticket illustrated by Fig. 2 is devised to apply to any station on the foreign railroads named at the bottom of same, the ticket illustrated by Fig. 2 naming twelve foreign lines, and may be sold to apply to any of the two thousand five hundred stations on the railroads listed on ticket. This I accomplish in the following manner: The ticket is made with the usual auditor's stub, agent's stub, omnibus-transfer, contract, dates for limiting, class, half-fare, baggage, and ticket-number, as illustrated by Fig. 2, having the space left blank for the destination, purchaser's and witness's signature, form, and route, as illustrated by Fig. 2, $a\ a\ a\ a\ a\ a$. After ticket is selected by the purchaser from the descriptive ticket-book, as before described, the agent completes ticket by inserting destination, form-letter, and route-number of the ticket selected from descriptive ticket-book in the blank spaces in the ticket for that purpose, Fig. 2, letters $a\ a\ a\ a\ a\ a$, punching the junction point or points, the railroads over which form and route reads, class, and limit in the squares for that purpose, Fig. 2, and when the ticket is a limited-contract ticket having purchaser sign same and agent or clerk witness the signature in the spaces designated, Figs. 2 and 4. The ticket is then ready for delivery to the purchaser.

The book illustrated by Fig. 3 is devised for use of conductors over which the tickets illustrated by Figs. 2 and 5, 6 travel and designed to take the place of the coupons now attached to through tickets. The last conductor on each of the lines over which ticket travels should make a copy of the ticket in this record of through-ticket book, Fig. 3, filling in what road issued by, from and to what point, route, form, number of ticket, punching class, half-fare, or limited, and send to his auditor with his report. This book may be dispensed with in the following manner, by having the auditor of the destination-line on receipt of ticket after its use make out reports to the intermediate line or lines. This gives the intermediate lines a check on the statement received from the line that issues the ticket, thus obviating the necessity for use of the book illustrated by Fig. 3 or the agent issuing the ticket to make out the report illustrated in Fig. 3 from agent's stub and send daily by first express to the intermediate lines.

Fig. 4 represents part of the back of the ticket on which is printed a consideration clause, making it a part of the purchase price that party travels on the ticket and is devised to prevent the sale of the ticket to any second party, this part-purchase price for the ticket clause to be signed by the purchaser and witnessed by the person selling the ticket, as illustrated by the drawing Fig. 4.

The ticket illustrated by Figs. 5, 6 is designed for use as a round-trip ticket and designed to apply to any round-trip ticket in the descriptive ticket-book designed similar to the one-way ticket illustrated in Fig. 2, with the addition of the words "and return."

The stations from and to and form and route letters or numbers are left blank, the ticket to be completed from descriptive ticket-book in the same manner described for ticket illustrated by drawings, Fig. 2, having blank squares below the name of each railroad over which ticket travels for the conductors of the line above said squares to punch, (see Fig. 6,) also having squares for punching the identification description of the purchase by the height, size, and hair, as illustrated, Fig. 5.

The railroad issuing ticket may elect to use its initials or a part of them to designate the form or the route of the ticket. This will assist in avoiding the confusion of forms or routes by different railroads using similar initial letters.

As many additional railroads and junction-points may be added to ticket illustrated by Figs. 2 and 5, 6 as is deemed advisable by the railroad issuing ticket, the ticket may be made to apply over at least twenty-five foreign lines without increasing its complication.

From the foregoing description it will be seen that my improved ticket is adapted for transportation over one or more groups of lines radiating from junction-points on the issuing-line. For example, a ticket sold at Washington for a destination via Pittsburg will contain the names of all lines connecting Pittsburg with said destination with which the issuing-line has an arrangement, and the passenger may in purchasing his or her ticket elect any one of the lines connecting the Pittsburg junction with the destination.

Referring to the ticket illustrated by Figs. 2 and 5, 6, that part of the ticket reading from "via junction point and acct. route punched below" downward, taking in the junction-points and railroads, may be left blank and made to read via route and junction-point stamped or written below, as illustrated by drawing Fig. 7, after ticket is selected by the passenger the railroads and routes to be stamped with a rubber stamp, Fig. 8, or written in the blank spaces. By using the rubber stamp or writing in the junctions and railroads the ticket is greatly simplified. This ticket is then available for use by all the stations on the line issuing the ticket and via any junction-point on the system, thus making but the two regular kinds of tickets (one-way and round-trip) necessary to be kept in stock for general use. With the junction-points and railroads printed in the ticket it is necessary to have groups of tickets for each junction-point, grouping the various routes that apply to a certain terminal point—for example, to New York, Boston, Washington, New Orleans, &c.

To devise a ticket that is hard to counterfeit or alter any of its parts, I attain same in the following manner: first, by printing the ticket with copying-ink on very thin strong white paper, the printing to be all capital letters without any shading or scrollwork of any kind whatever, all the entries and signatures to complete the ticket being made with a copying-pencil or with copying-ink, and when completed run ticket through a wringer, in connection with a damp piece of paper, in the same manner as is now done in the copying of telegraph messages, but placing the damp paper on the back side of the ticket to draw the printing and writing thoroughly into the paper, or print each ticket in capital letters, using black non-copying ink, and dampen ticket in the manner described for copying same and while paper is damp writing with copying-pencil the entries and signatures necessary to complete the ticket, making the writing as indelible as the printing. This system for making the ticket indelible is quickly accomplished. These tickets are worthless when stolen, for they have no form or route, nor are the railroads and junction-points designated.

The different systems of through tickets in use require from five hundred to three thousand different kinds of tickets and from five thousand to thirty thousand tickets in stock, while my system of through tickets is represented by two to one hundred kinds of tickets and from five hundred to one thousand tickets in stock, with each system selling the same number of tickets monthly. With my system the style of the ticket may be changed and improved easily at any time, for all the tickets are made of but two kinds—one-way and round-trip—and are all used up before a new pad is opened for use and should be made in pads of not to exceed one hundred tickets, numbering from No. 1 consecutively for each of the different kinds. This ticket is only half the size of the older style of tickets now in use, all the foreign lines with whom the line issuing the ticket interchange business to be supplied with one of the descriptive ticket-books.

Having described my invention of a transportation-ticket system in the foregoing specification, what I claim as new, and desire to secure by Letters Patent, is—

1. In combination, a transportation-ticket for all routes said ticket bearing matter rendering it good for passage and having thereon designated blank spaces for the reception of matter denoting a specific route, and a plurality of sheets each having thereon matter descriptive of a specific route and distinctive matter indicating such route.

2. In combination, a transportation-ticket for all routes said ticket bearing matter rendering it good for passage and having thereon designated blank spaces for the reception of matter denoting a specific route, a plurality of sheets each having thereon matter descriptive of a specific route and distinctive matter indicating such route, and a sheet having designated blank spaces for the entry of a description of the completed ticket.

3. In combination, a plurality of sheets each having thereon matter descriptive of a specific route and distinctive matter indicating a form and said route, and a universal transportation-ticket bearing matter rendering it good for passage, and having designated blank spaces for the insertion of matter identifying it by form and route with one of said sheets.

4. In combination, a plurality of sheets each having thereon matter descriptive of a specific route and identifying form and route characters, and a universal transportation-ticket bearing matter rendering it good for passage and having designated blank spaces to receive insertions in accordance with the descriptive matter on one of said sheets, and having other designated blank spaces to receive identifying characters corresponding to those on the sheet.

In testimony whereof I have signed my name to this specification in the presence of two subscribing witnesses.

PRESTON C. DOCKSTADER.

Witnesses:
CHARLES H. DUDLEY,
THOS. J. FISHER.